United States Patent [19]
Itskin et al.

[11] Patent Number: 5,809,537
[45] Date of Patent: Sep. 15, 1998

[54] METHOD AND SYSTEM FOR SIMULTANEOUS PROCESSING OF SNOOP AND CACHE OPERATIONS

[75] Inventors: Randall Clay Itskin, Austin; John Carmine Pescatore, Jr., Georgetown, both of Tex.; Amjad Z. Qureshi, San Jose, Calif.; David Brian Ruth, Austin, Tex.

[73] Assignee: International Business Machines Corp., Armonk, N.Y.

[21] Appl. No.: 957,399

[22] Filed: Oct. 23, 1997

Related U.S. Application Data

[63] Continuation of Ser. No. 569,546, Dec. 8, 1995, abandoned.
[51] Int. Cl.[6] .............................. G06F 12/08; G06F 13/28
[52] U.S. Cl. .......................... 711/146; 711/168; 395/855
[58] Field of Search ................................. 711/146, 168, 711/145; 395/855

[56] References Cited

U.S. PATENT DOCUMENTS

| | | | |
|---|---|---|---|
| 4,426,681 | 1/1984 | Bacot et al. | 711/130 |
| 5,025,365 | 6/1991 | Mathur et al. | 711/121 |
| 5,119,485 | 6/1992 | Ledbetter, Jr. et al. | 711/146 |
| 5,157,774 | 10/1992 | Culley | 711/139 |
| 5,228,135 | 7/1993 | Ikumi | 711/146 |
| 5,249,283 | 9/1993 | Boland | 711/146 |
| 5,325,503 | 6/1994 | Stevens et al. | 711/146 |
| 5,335,335 | 8/1994 | Jackson et al. | 711/121 |
| 5,339,399 | 8/1994 | Lee et al. | 711/146 |
| 5,341,487 | 8/1994 | Derwin et al. | 711/146 |
| 5,361,340 | 11/1994 | Kelly et al. | 711/3 |
| 5,369,753 | 11/1994 | Tipley | 711/122 |
| 5,386,511 | 1/1995 | Murata et al. | 711/120 |
| 5,502,828 | 3/1996 | Shah | 711/146 |
| 5,509,137 | 4/1996 | Itomitsu et al. | 711/145 |
| 5,526,510 | 6/1996 | Akkary et al. | 711/133 |
| 5,598,550 | 1/1997 | Shen et al. | 711/146 |
| 5,640,534 | 6/1997 | Liu et al. | 711/146 |

*Primary Examiner*—Reginald G. Bragdon
*Attorney, Agent, or Firm*—Richard A. Henkler

[57] ABSTRACT

A method and system for simultaneous retrieval of snoop address information in conjunction with the retrieval/storing of a cache line load/store operation. The method and system are implemented in a data processing system comprising at least one processor having an integrated controller, a cache external to the at least one processor, and an interface between the at least one processor and the external cache. The external cache includes a tag array and a data array. Standard synchronous static Random Access Memory (RAM) is used for the tag array, while synchronous burst made static RAM is used for the data array. The interface includes a shared address bus, a load address connection and an increment address connection. A cache line load/store operation is executed by placing an address for the operation on the shared address bus, and latching the address with the external cache using a signal from the load address connection. Thereafter, the latched address is incremented in response to a signal from the increment address connection. This allows the shared address bus to be used for execution of snoop operations simultaneously with the retrieval/storage of a cache line load/store operation.

12 Claims, 5 Drawing Sheets

METHOD AND SYSTEM FOR SIMULTANEOUS PROCESSING OF SNOOP AND CACHE OPERATIONS

This is a continuation of application Ser. No. 08/569,546, filed Dec. 8, 1995, now abandoned.

BACKGROUND

1. Field of the Present Invention

The present invention generally relates to data processing systems. More specifically, the present invention relates to the implementation of a method and system for simultaneous processing of snoop and cache operations from an external cache.

2. History of Related Art

The major driving force behind computer system innovation has been the demand by consumers for faster and more powerful computers. One of the major hurdles for increasing the speed of the computer has historically been the speed with which data can be accessed from memory, often referred to as the memory access time. The microprocessor, with its relatively fast processor cycle times, has generally been delayed by the use of wait states during memory accesses to account for the relatively slow memory access times. Accordingly, improvement in memory access times has been one of the major areas of research for increasing the speed of the computer.

One such development which has resulted from the research is the use of cache memory. A cache is a small amount of very fast, and expensive, near zero wait state memory that is used to store a copy of frequently accessed code and/or data from main memory. By combining the use of cache memory with the microprocessor the number of wait states that are normally imposed during memory access can be significantly reduced. Thus, when the processor requests data from main memory and the data resides in the cache, then a cache read hit takes place, and the data from the memory access can be returned to the processor from the cache with minimal wait states. If the data does not reside in the cache, then a cache read miss occurs. In a cache read miss, the memory request is forwarded to the system, and the data is retrieved from main memory, as would normally occur in a system not having a cache. On a cache miss, the data that is retrieved from main memory is provided to the processor and is also written into the cache according to the statistical likelihood that this data will be requested again by the processor.

An efficient cache yields a high "hit rate". A hit rate is defined as the percentage of cache hits that occur during all requested memory accesses. If a cache has a high hit rate, then the majority of memory accesses are serviced with a low wait state. The net effect of a high cache hit rate is that the wait states incurred on a relatively infrequent miss are averaged over a large number of low wait state cache hit accesses, resulting in nearly all access having a low wait state. Also, since a cache is usually located on the local bus of the processor, cache hits are serviced locally without requiring use of the system bus. Consequently, a processor which is operating out of its local cache has a much lower bus utilization. A lower bus utilization reduces system bus bandwidth used by the processor, making more bandwidth available for CPUs or other devices, such as intelligent bus masters, which can independently gain access to the bus.

Another important feature provided by the use of a local cache for a processor is the ability of the processor to operate using the local cache without requiring control of the system bus, thereby increasing the efficiency of the overall computer system. In contrast, the processor of computer systems which fail to utilize caches must remain idle while it is waiting to have control over the system bus. This type of system reduces the overall efficiency of the computer system since the processor is unable to perform any useful work at this time.

Important considerations for determining cache performance are the organization of the cache, and the cache management policies that are employed in the cache. In general, a cache can be can be organized into either a direct-mapped or set-associative configuration. In a direct-mapped organization, the physical address space of the computer is conceptually divided into a number of equal pages, with the page size equaling the size of the cache. The cache is partitioned into a number of sets, with each set having a certain number of lines. The line size is usually on the order of a magnitude of 32–128 bytes or more. Each one of the conceptual pages defined in main memory has a number of lines equivalent to the number of lines in the cache, and each line from a respective page in main memory corresponds to a similarly located line in the cache.

An important characteristic of a direct-mapped cache is that each memory line from a conceptual page defined in main memorys referred to as a page offset, can only reside in the equivalently located line or page offset in the cache. Due to this restriction, the cache only need refer to a certain number of the upper address bits of a memory address, referred to as a tag, in order to determine if a copy of the data from the respective memory address resides in the cache because the lower order address bits are pre-determined by the page offset of the memory address.

A set-associative cache includes a number of banks, or ways, of memory that are each equivalent in size to a conceptual page defined in main memory. Accordingly, a page offset in main memory can be mapped to a number of locations in the cache equal to the number of ways in the cache. For example, in a four-way set-associative cache, a line or page offset from main memory can reside in the equivalent page offset location in any of the four ways of the cache. As with a direct-mapped cache, each of the ways in a multiple way cache is partitioned into a number of sets each having a certain number of lines. In addition, a set-associative cache, usually, includes a replacement algorithm such as Least Recently Used (LRU) algorithm, that determines which bank, or way, with which to fill data when a read miss occurs.

Cache management is usually performed by a device referred to as a cache controller. One such cache management duty performed by a cache controller is the management of processor writes to memory. The manner in which write operations are managed determines whether a cache is designated as "write-through" or "write-back". When the processor initiates a write to main memory, the cache is first checked to determine if a copy of the data from this location reside in the cache. If a processor write hit occurs in write-back cache design, then the cache location is updated with the new data, and the main memory is only updated later if another write occurs to this cache location or this data is requested by another device, such as a bus master. Alternatively, the cache maintains the correct or "clean" copy of data thereafter, and the main memory is only updated when a flush operation occurs.

In a write-through cache, the main memory location is typically updated in conjunction with the cache location on a processor write hit. If a processor write miss occurs to a write-through cache, the cache controller may either ignore the write miss or may perform a "write-locate", whereby the cache controller allocates a new line in the cache in addition to passing the data to the main memory. In a write-back cache design, the cache controller allocates a new line in the cache when a processor write miss occurs. This usually involves reading the remaining entries from main memory to fill the line in addition to allocating the new write data.

Typically, the cache controller includes a directory which holds an associated entry for each set in the cache. In a write-through cache, this entry has three components: a tag, a tag valid bit, and a number of line valid bits equaling the number of lines in each cache set. The tag acts as a main memory page number, and it holds the upper address bits of the particular page in main memory from which the copy of data residing in the respective set of the cache originated. The status of the tag valid bit determines whether the data in the respective set of the cache is considered valid or invalid. If the tag valid bit is clear, then the entire set is considered invalid. If, however, the tag valid bit is true, then an individual line within the set is considered valid or invalid depending on the status of its respective line valid bit.

In a write-hack cache, the entries in the cache directory are comprised of a tag and a number of tag state bits for each of the lines in each set. As before, the tag comprises the upper address bits of the particular page in main memory from which the copy originated. The tag state bits determine the status of the data for a respective line, i.e., whether the data is invalid, exclusively owned and modified, exclusively owned and unmodified, or shared.

A principal cache management policy is the preservation of cache coherency. Cache coherency refers to the requirement that any copy of data residing in a cache must be identical to (or actually be) the owner of that location's data. The owner of a location's data is defined as the respective location having the most recent or the correct version of data. The owner of data is either an unmodified location in main memory, or a modified location in a write-back cache.

In computer systems having multiple processors or independent bus masters which can access memory, there is a possibility that a bus master, other processor, or video graphics card, might alter the contents of a main memory location that is duplicated in the processor s cache. When this occurs, the processor's cache is said to hold "stale", "dirty", or invalid data. Also, when the processor executes a cache write hit operation to a write-back cache, the cache receives the new data but main memory is not updated until a later time, if at all.

In this instance, the cache contains a "clean" or correct version of the data and is said to own the location, and the main memory holds invalid or "dirty" data. Problems would arise if a processor was allowed to access dirty data from the cache, or if a bus master was allowed to directly access data from main memory. Therefore, in order to maintain cache coherency, i.e., in order to prevent a device such as a processor or bus master from inadvertently receiving incorrect or dirty data, it is necessary for the cache controller of a processor to monitor the system bus for bus master or other processor accesses to main memory when the processor does not have control of the system bus. This method of monitoring the bus is referred to as "snooping".

In a write-back cache design, the cache controller of a processor must monitor the system bus during memory reads by a bus master or other processors because of the possibility that the cache may own the location, i.e., the cache may contain the only correct copy of data for this location, referred to as modified data. This is referred to as read snooping. On a read snoop hit where the cache contains modified data, the cache controller provides the respective data to main memory, and the requesting bus master or other processor reads this data en route from the cache controller to main memory, this operation being referred to as "snarfing". Alternatively, the cache controller provides the respective data directly to the bus master or other processor and not to main memory. In this alternative scheme, the main memory would perpetually contain erroneous or "dirty" data until a cache flush occurred.

In both write-back and write-through cache designs, the cache controller of a processor must also monitor the system bus during bus master or other processor writes to main memory because the bus master or other processor may write to or alter a memory location having data that resides in the cache. This is referred to as write snooping. On a write snoop hit to a write-through cache, the cache entry is marked invalid in the cache directory by the cache controller, signifying that this entry is no longer correct. In a write-back cache, the cache is updated along with main memory, and the tag state bits are set to indicate that the respective cache location now includes a clean copy of the data. Alternatively, a write-back cache may invalidate the entire line on a snoop write hit. Therefore, in a write-back cache design, the cache controller must snoop both bus master and/or other processor reads and writes to main memory. In a write-through cache design, the cache controller need only snoop bus master or other processor writes to main memory.

In general, the process of snooping entails that the cache controller latch the system bus address and perform a cache look-up in the tag directory corresponding to the page offset location where the memory access occurred to see if a copy of data from the main memory location being accessed also resides in the cache. If a copy of the data from this location does reside in the cache, then the cache controller takes the appropriate action depending on whether a write-back or write-through cache design has been implemented, or whether a read or write snoop hit has occurred. This prevents incompatible data from being stored in main memory and the cache, thus preserving cache coherency.

Typically, caches have been designed independently of the processor. The cache was often placed on the local bus of the processor and interfaced between the processor and the system bus during the design of the computer system. However, with the development of high transistor density computer chips, many processors are currently being designed with an on-chip cache in order to meet performance goals with regard to memory access times. The on-chip cache used in these processors is generally small, an exemplary size being 8–32 kilobytes in size. The smaller, on-chip cache is generally faster than a large off-chip cache and reduces the gap between fast processor cycle times and the relatively slow access times of large caches.

In computer systems which utilize processors with on-chip caches, an external, second level cache is often added to the system to further improve memory access time. The second level cache is generally much larger than the on-chip cache, and provides an overall greater hit rate than the on-chip cache would provide by itself.

Furthermore, some of today's advanced processors are incorporating the second level (L2) cache controller into the chip as well. The interface between the processor and the level two cache is often direct-mapped in order to use industry Standard Static Rams (SRAMS) and to minimize the number of processor pins necessary to create the interface. In this type of configuration, the L2 cache data array address bits are shared with that of the L2 cache's tag array in order to save processor pins.

For the same reason, the L2 cache data bus is made smaller than the L2 cache data bus line size. Thus, resulting in requiring multiple L2 cache accesses (typically 4 or 8) to load or store an L2 cache line.

Although there are advantages to sharing the tag and data array address bus, such as the elimination of the number of processor pins used, the sharing of the tag and data array address bus can result in a performance bottleneck at the L2 cache interface in snoop-based operations, such as that performed in a Symmetrical Multi-processor (SMP) system. This outcome is from the fact that addresses generated by other processors must be snooped at the L2 interface. Snoop cycles contend with, and typically have a higher priority than, cache line load/store accesses. In high-performance systems with high address bus utilization, this contention can increase the effective L2 cache line load/store latency to such a degree so as to seriously degrade system performance and limit the scaleability of the system.

It would be a distinct advantage to have a method and system which improves the cache load/store latency during snoop operations, while continuing to allow the shared use of the tag and data array address bus. More specifically, in contrast to the related art, the method and system would allow simultaneous retrieval of snoop and cache line load/store tag and data information, respectively, in conjunction with the retrieval/storing of a cache line. Thereby, decreasing cache line load/store latency, and improving the overall speed of the system. The present invention provides such a method and system.

SUMMARY OF THE PRESENT INVENTION

In summary the present invention is a method and system for simultaneous retrieval of snoop address information in conjunction with the retrieval/storing of a cache line.

In one aspect, the present invention is a data processing system comprising main memory for storing data, and a cache for storing a subset of the stored data, and for storing a location where each one of the members of the subset resides in the main memory. The data processing system further comprising communication means, coupled to the main memory, for communication of the main memory data. The data processing system also comprising a processor, coupled to the communication means, for controlling access to the stored subset and the stored locations, and for snooping the communication means for a request for data residing in the subset. The data processing system further comprising interface means, coupled between the processor and the cache, for allowing simultaneous processing by the processor of an operation for data residing in the subset, and retrieval of the stored location for the requested data.

In another aspect, the present invention is a method implemented in a data processing system comprising at least one processor, a system bus, main memory, and a cache external to the at least one processor. The method simultaneously processing cache operations for the external cache. The method includes detecting a request on the system bus for data residing in the main memory. The method further includes the step of processing an operation requested by the at least one processor for data residing in the external cache. The method also includes the step of retrieving, simultaneously with the processing, an indication whether data for the location of the detected request resides in the external cache.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
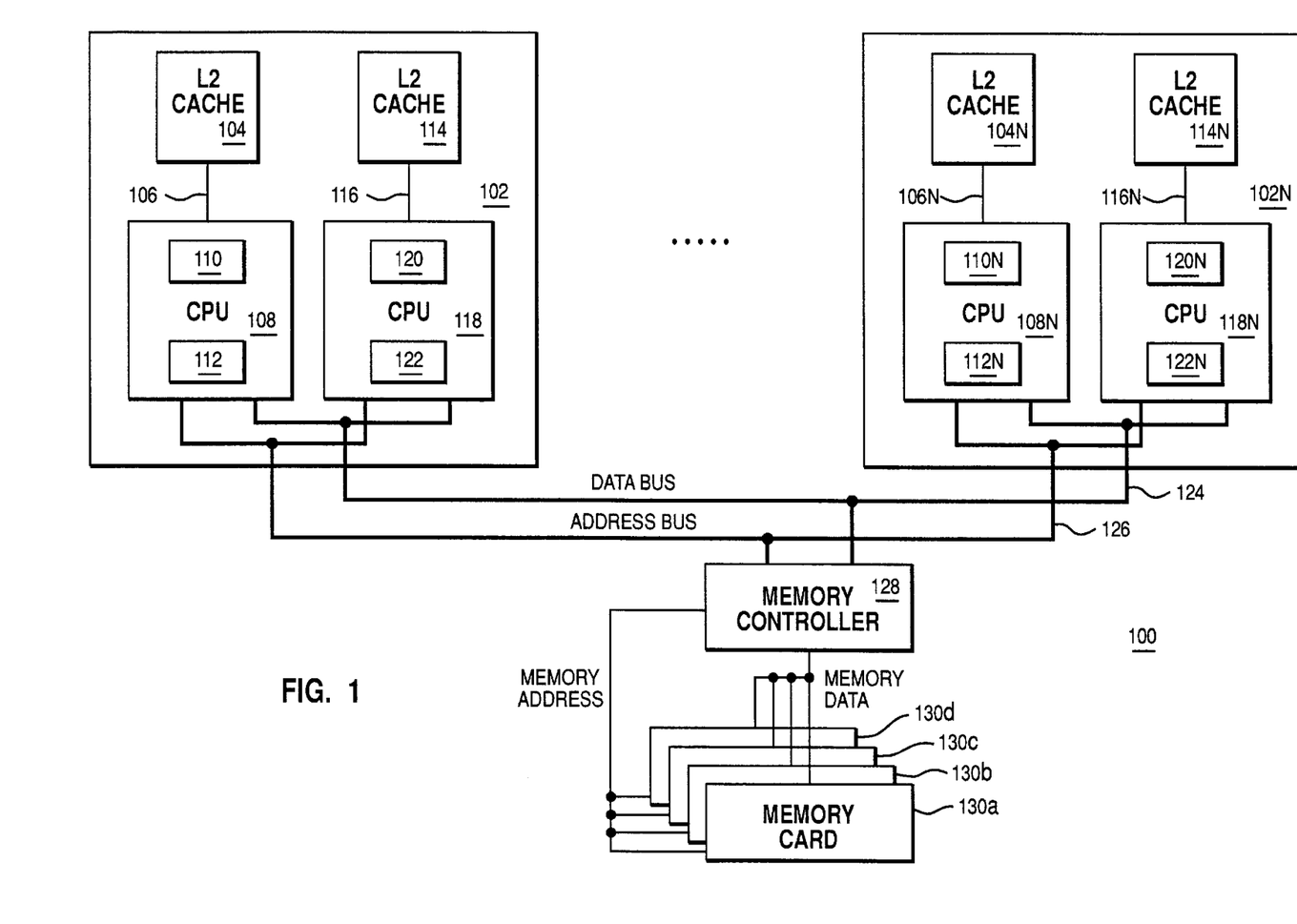
FIG. 1 is a schematic diagram of a Symmetrical Multi-Processor system (SMP) in which a preferred embodiment of the present invention is practiced.

Reference now being made to FIG. 1, a schematic diagram of a Symmetrical Multi-Processor system (SMP) 100 is shown in which a preferred embodiment of the present invention is practiced. SMP 100 includes a plurality of Central Processing Unit (CPU) subsystems 102–102n, a memory controller 128, a plurality of memory subsystems (cards) 130a–130d, a data bus 124, and an address bus 126. The use of memory controllers and memory subsystems is well known and understood by those of ordinary skill in the art. Accordingly, the memory controller 128 and memory subsystems 130a–130d are only mentioned briefly to indicate their respective operations in connection with the preferred embodiment of the present invention.

Memory controller 128 uses standard techniques which are well known by those of ordinary skill in the art for controlling access to each one of the memory subsystems 130a–130d from any one of the CPU subsystems 102–102n. Each one of the memory subsystems 130a–130d is used for the storing of information related to the execution of instructions from one or all of the CPUs 102–102n. The address bus 112, and the data bus 110 are used for communication of data and address information, respectively, between the CPU subsystems 102–102n and the memory controller 128.

Each one of the CPU subsystems 102–102n includes two Central Processing Units (CPUs) 108–108n and 118–118n, respectively. Each one of the CPU subsystems 102–102n also include two level two (L2) external caches 104–104n and 114–114n, respectively. Each one of the CPUs 108–108n and 118–118n include an integrated level one cache and controller indicated by designations 112–112n and 122–122n, respectively. Each one of the CPUs 108–108n and 118–118n also include an integrated level two (L2) cache controller 110–110n and 120–120n, respectively. The CPUs 108–108n and 118–118n may be, for example, the PowerPC [TM] 620 produced by International Business Machines or Motorola.

The L2 cache controllers 110–110n and 120–120n may use any one of a number of cache management organization techniques. For example, in the preferred embodiment of the present invention the L2 cache controllers 110–110n and 120–120n employ a "direct-mapped" organization technique. Cache interfaces 106–106n and 116–116n provide communication between the L2 cache controllers 110–110n and 120–120n, and the CPUs 108–108n and 118–118n, respectively. In order to better understand how the present invention increases the bandwidth for cache line store/load access by an external cache, a prior art system is first explained, and thereafter, a preferred embodiment of the present invention is presented in light thereof.

Figure 2:
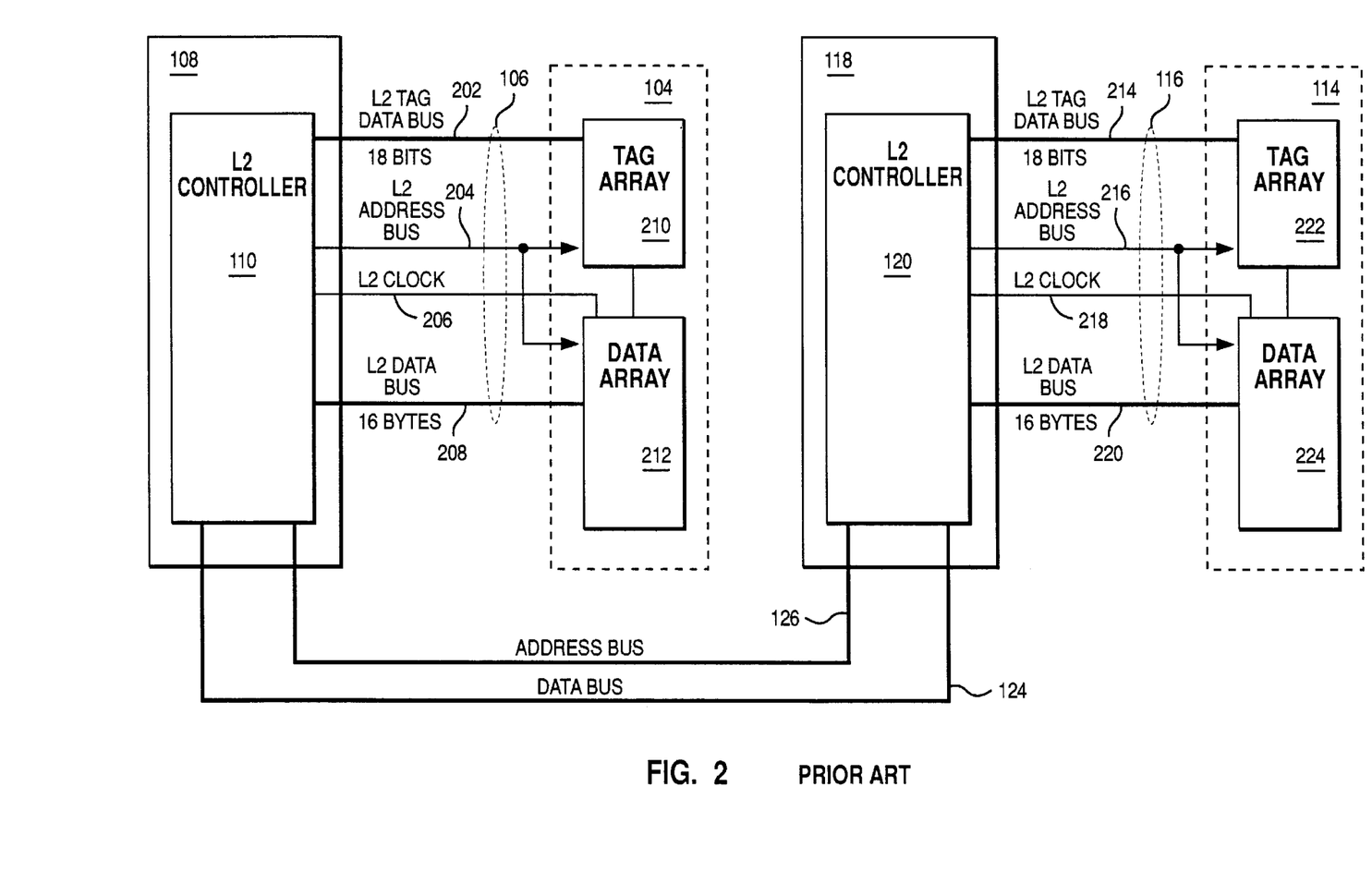
FIG. 2 (PRIOR ART) is a schematic diagram illustrating a prior art system for implementing the level two cache interfaces for two of the level two caches of FIG. 1.

Reference now being made to FIG. 2 (PRIOR ART), a schematic diagram is shown illustrating a prior art system for implementing the L2 cache interfaces 106 and 116 for the L2 caches 104 and 114 of FIG. 1. As can be seen from FIG. 2, the L2 cache interfaces 106 and 116 include, respectively, L2 tag data buses 202 and 214, L2 address buses 204 and 216, L2 clocks 206 and 218, and L2 data buses 208 and 220. It can be further seen from FIG. 2, that the L2 caches 104 and 114 include tag arrays 210 and 222, and data arrays 212 and 224, respectively. In the following discussion only the 106 interface is explained; It should be noted, however, that the discussion is equally applicable to the 116 interface as well.

One of the main objectives in designing CPUs is to keep the required number of pins to a minimum. One way to accomplish this objective is to share the address bus between the tag array and the data array, and to make the address bus smaller than the cache line size. CPU 108 is designed according to the above stated objective. Accordingly, L2 address bus 204 is shared between tag array 210 and data array 212, and L2 address bus 204 is smaller in size than the L2 cache 104 line size. Since the L2 data bus 208 is smaller than the L2 cache 104 line, cache load/store operations require multiple accesses to the L2 cache 104.

The sharing of the L2 address bus 204, in this manner, can result in a performance bottleneck at the interface 106. The bottleneck is created by the L2 controller 110 "snooping" other addresses generated by the other CPUs of SMP system 100 (FIG. 1). Snoop cycles typically have a higher priority than cache line load/store accesses. As snoop cycles interfere with the utilization of the L2 address bus 204 by cache load/store operations, the load/store latency of the L2 cache 104 is increased to such a degree so as to seriously degrade the SMP system 100 performance and limit its scaleability.

Figure 3:
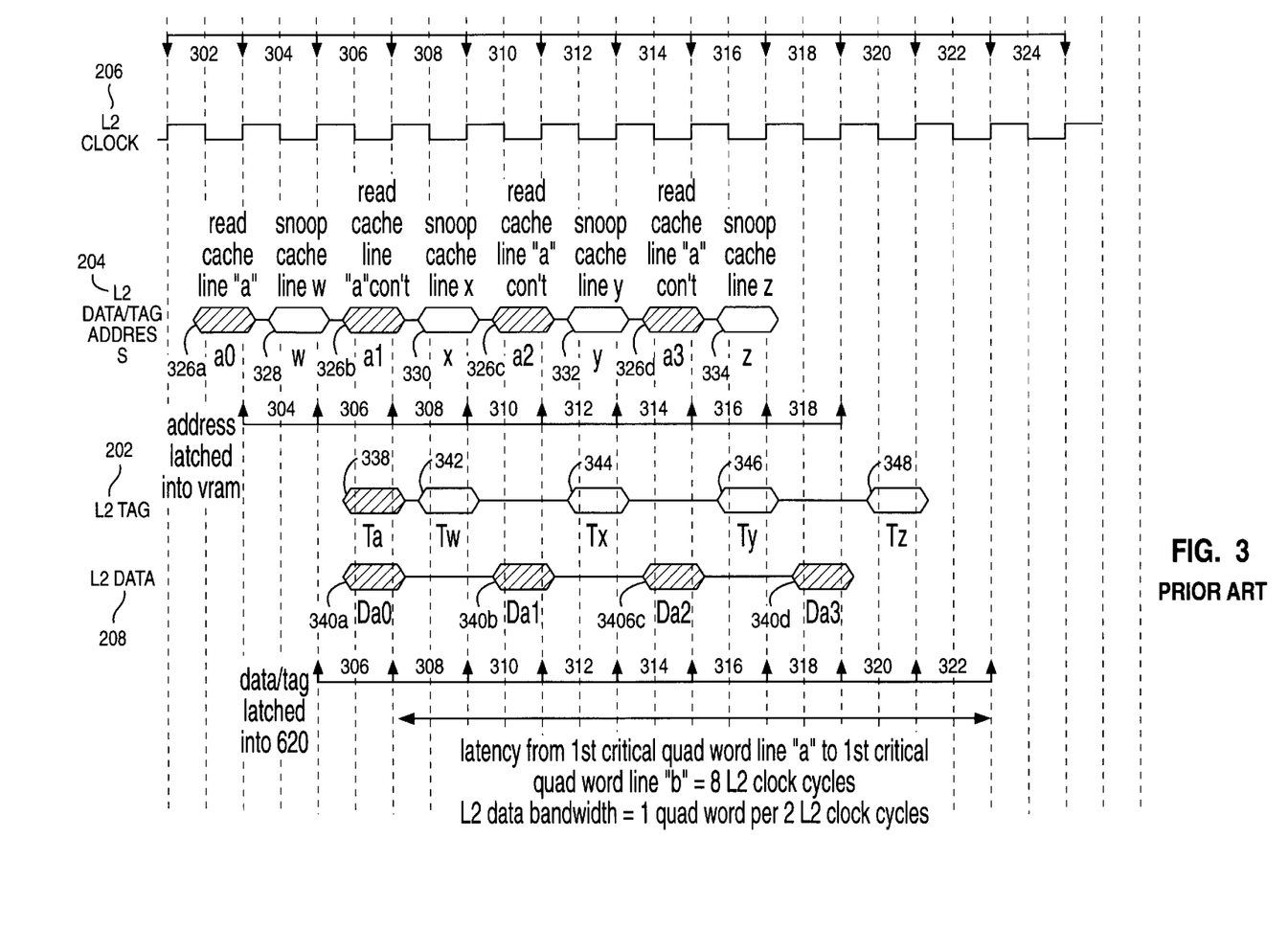
FIG. 3 (PRIOR ART) is an example of timing diagram illustrating cache line load/store latency for the one of the level two caches of FIG. 2.

Reference now being made to FIG. 3 (PRIOR ART), an example of timing diagram is shown illustrating cache line load/store latency for the L2 cache 104 using the interface 106 of FIG. 2 (PRIOR ART). In this example, it is assumed that the L2 cache 104 line size is 64 bytes and the L2 data bus 208 size is 16 bytes. Furthermore, the L2 clock 206 is shown for twelve cycles designated as 302—324, respectively (L2 cycles 302–324). In order to clarify the latency effects for cache line load/store operations using the prior art interface 106, the snoop and cache line load/store operations are explained in reference to each L2 clock 206 cycle.

At L2 cycle 302, an address A0 326a for a L2 cache 104 line read operation is placed on the L2 address bus 204. Before L2 cycle 304, a request for a first snoop operation is received. Accordingly, at L2 cycle 304, an address W 328 for the first snoop operation is placed on the L2 address bus 204, resulting in the interruption of the processing of the cache read operation. At L2 cycle 306, the following occurs:

(1) the next sequential address A1 326b for the cache read is placed on the L2 address bus 204;

(2) the tag information TA 338 for the cache read is latched by the L2 controller 110; and (3) the data information DA0 340a for the cache read address 326a is also latched by the L2 controller 110.

Before the L2 cycle 308, a second snoop operation is received by the L2 controller 110. Once again, interrupting the processing of the cache read operation. Accordingly, during the L2 cycle 308 the following occurs:

(1) an address X 330 for the second snoop operation is placed on the L2 address bus 204; and (2) the tag information TW 342 for the first snoop address W 328 is latched by the L2 controller 110.

At L2 cycle 310 the following occurs:

(1) the next sequential address A2 326c for the cache read operation is placed on the L2 address bus 204; and (2) the data information DA1 340b for the cache read address 326b is latched by the L2 controller 110.

Before L2 cycle 312, a third snoop operation is received by the L2 controller 110. Thus, interrupting the processing of the cache read operation. Accordingly, at L2 cycle 312, the following occurs:

(1) an address Y 332 for the third snoop operation is placed on the L2 address bus 204; and (2) the tag information Tx 344 for the second snoop address X 330 is latched by the L2 controller 110.

At L2 cycle 314, the following occurs:

(1) the next sequential address A3 326d for the cache read is placed on the L2 address bus 204; and (2) the data information DA2 340c for the cache read address A2 326c is latched by the L2 controller 110.

Before L2 cycle 316, a fourth snoop operation is received by the L2 controller 110. Once again, interrupting the processing of the cache read. Accordingly, the following occurs at L2 cycle 316:

(1) an address Z 334 for the fourth snoop operation is placed on the L2 address bus 204; and (2) the tag information Ty 346 for the third snoop address Y 332 is latched by the L2 controller 110.

At L2 cycle 318, the data information DA3 340d for the cache read address A3 326d is latched by the L2 controller 110. At L2 cycle 320, the tag information Tz 348 for the fourth snoop address Z 334 is latched by the L2 controller 110.

From the above description, it can readily be seen that as the number of snoop operations increases, the latency for L2 cache 104 line load/store operations increases proportionately.

Figure 4:
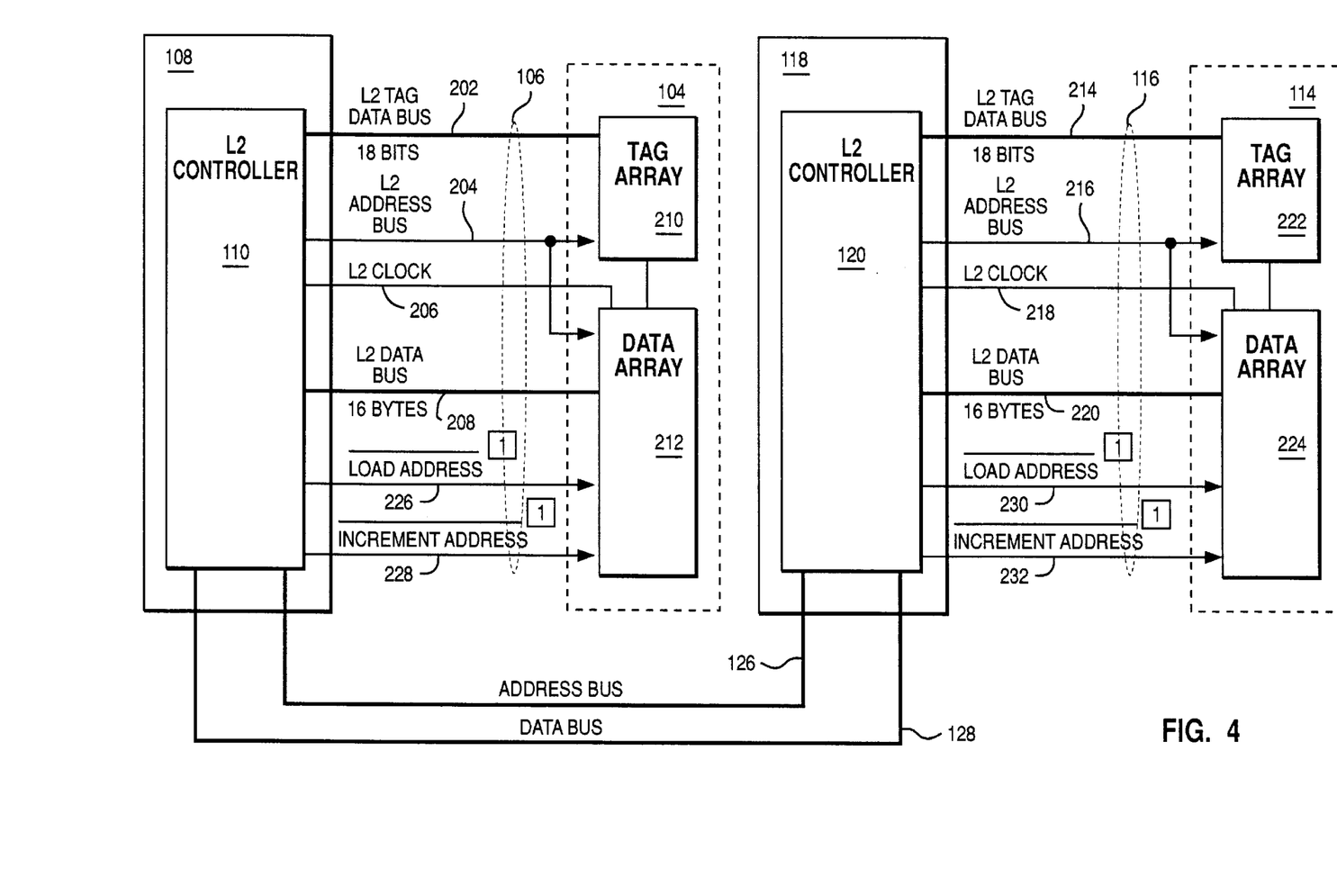
FIG. 4 is a schematic diagram illustrating a preferred embodiment for implementing the level two cache interfaces of FIG. 1 for simultaneous retrieval of snoop and cache load/store information according to the teachings of the present invention.

Reference now being made to FIG. 4, a schematic diagram is shown for illustrating a preferred embodiment for implementing the interfaces 106–106n and 116–116n of FIG. 1 for simultaneous retrieval of snoop information in conjunction with the retrieval/storing of a cache line load/store information according to the teachings of the present invention. As can be seen from FIG. 4 only interfaces 106 and 116 are shown. It should be understood, however, that each of the interfaces 106–106n and 116–116n of SMP 100 are implemented in a similar fashion.

The L2 cache interfaces 106 and 116 include, respectively, L2 tag data buses 202 and 214, L2 address buses 204 and 216, L2 clocks 206 and 218, L2 data buses 208 and 220, load address connections 226 and 230, increment address connections 228 and 232. In the following discussion only interface 106 is explained, however, it should be clearly understood that it is equally applicable to interface 116.

It can be further seen from FIG. 4, that the L2 cache 104 includes a tag array 210 and a data array 212. In order to reduce the number of pins required by the CPU 108, the L2 address bus 204 is shared between the tag array 210 and the data array 212. Standard burst mode Static Random Access Memory (SRAM) is used for the data array 212. The L2 data bus is 16 bytes, and the cache line is 64 bytes. Thus, four sequential accessess to load/store a cache line are required.

The simultaneous retrieval of snoop and cache load/store information is supported by the 106 interface through the use of the load address 226 connection and the increment address 228 connection. The load address connection 226 is used for transmitting a load address signal to the data array 212. The load address signal informs the data array 212 when to latch an address provided on the L2 address bus 204. The increment address connection 228 is used for transmitting an increment address signal to the data array 212. The increment address signal informs the data array 212 when to increment a previously latched address.

By using the load and increment address signals, the present embodiment allows simultaneous retrieval of snoop information in conjunction with the retrieval/storing of a cache line from L2 cache 104. For example, assuming that the L2 cache 104 line is 64 bytes in size, and that the L2 address bus 204 is 16 bytes in size, the present embodiment allows L2 cache 104 line load/store operations to only require the use of the L2 address bus 204 once during the four L2 clock 206 cycles required to complete the cache line load/store.

Figure 5:
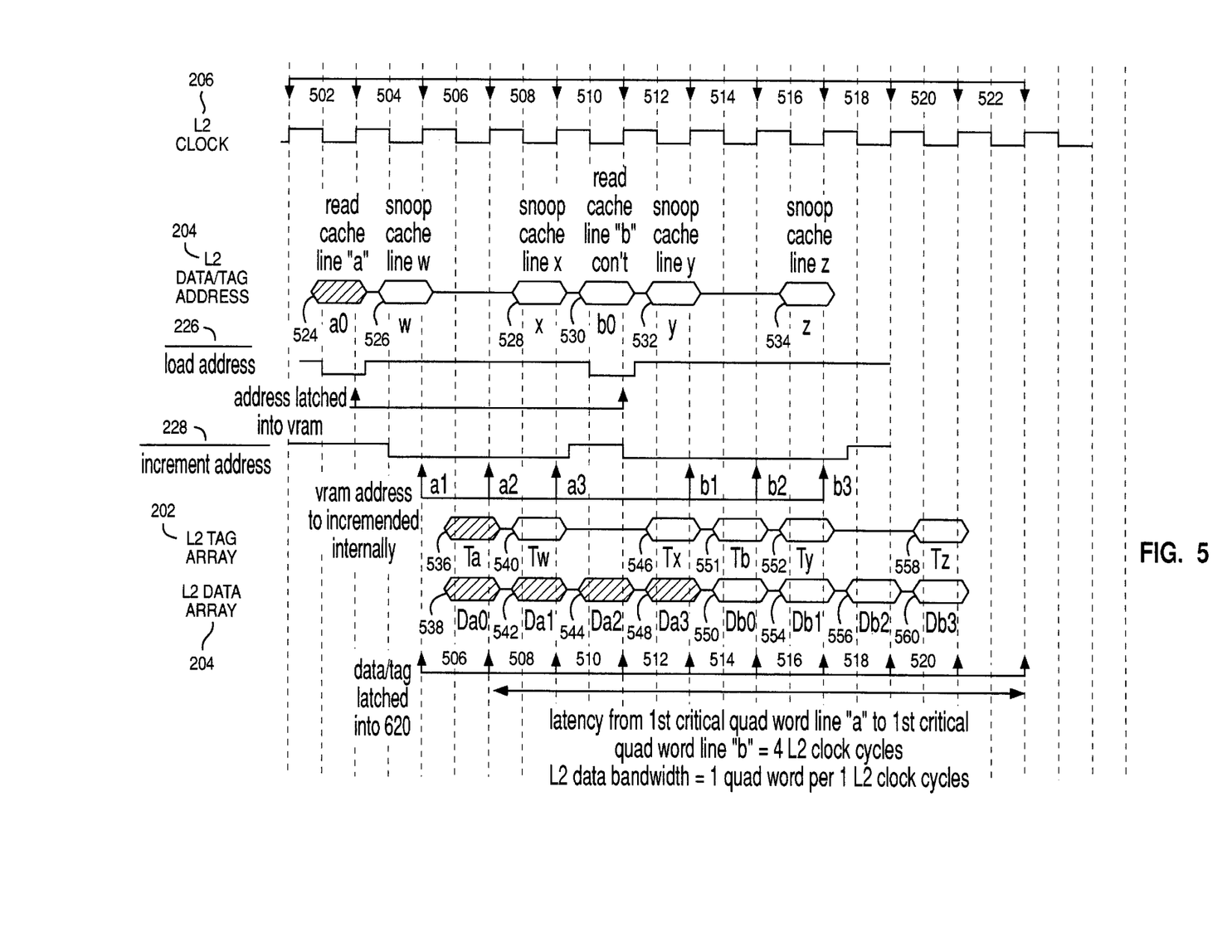
FIG. 5 is a timing diagram illustrating an example of the load/store latency for one of the level two caches of FIG. 4 according to the teachings of the present invention.

Reference now being made to FIG. 5, a timing diagram is shown illustrating an example of the load/store latency for L2 cache 104 of FIG. 4 using the improved interface 106 of FIG. 4 according to the teachings of the present invention. In this example, the L2 clock 206 is shown for eleven cycles designated as 502–522 respectively (L2 cycles 502–522). In order to clarify the latency effects for cache line load/store operations using the 106 interface, the snoop and cache line load/store operations are explained in reference to each L2 clock 206 cycle.

At L2 cycle 502, an address A0 524 for a first L2 cache 104 line read is placed on the L2 address bus 204, and the load address connection 226 is driven to an active low state. In response to detecting the load address connection 226 being driven low, the data array 212 latches the address A0 524. At L2 cycle 504, the following occurs:

(1) an address W 526 for a first snoop operation is placed on the L2 address bus 204;

(2) the load address connection 226 is returned to an inactive high state.

(3) the increment address connection 228 is driven to an active low state. In response to detecting the low state of the increment address connection 228, the data array 212 proceeds to increment the latched address A0 524, referred to hereinafter as A1 524; and At L2 cycle 506, the following occurs:

(1) the latched address A1 524 is incremented, hereinafter referred to as A2 524;

(2) the tag information Ta 536 for the cache read address A0 524 is latched by the L2 controller 110; and (3) the data information DA0 538 for the cache read address A0 524 is latched by the L2 controller 110.

At L2 cycle 508, the following occurs:

(1) an address X 528 for a second snoop operation is placed on the L2 address bus 204;

(2) the latched address A2 524 is incremented, hereinafter referred A3 524;

(3) tag information Tw 540 for the first snoop address W 526 is latched by the L2 controller 110; and (4) the data information DA1 542 for cache read address A1 524 is latched by the L2 controller 110.

At L2 cycle 510, the following occurs:

(1) an address B0 530 for a second L2 cache 104 read is placed on the L2 address bus 204;

(2) the load address connection 226 is driven to an active low state. In response to detecting the load address connection 226 being driven low, the data array 212 latches the address B0 530;

(3) the increment address connection 228 is driven to an inactive high state. In response to detecting the high state of the address connection 228, the data array 212 no longer increments the latched address B0 530; and (4) the data information DA2 for the first cache read address A2 544 is latched by the L2 controller 110.

At L2 cycle 512, the following occurs:

(1) an address Y 532 for a third snoop operation is placed on the L2 address bus 204;

(2) the load address connection 226 is returned to an inactive high state;

(3) the increment address connection 228 is driven to an active low state. In response to detecting the active low state of the address connection 228, the data array 212 increments the second cache read address B0 530, hereinafter referred to as B1 530;

(4) the tag information Tx 546 for the second snoop address X 528 is latched by the L2 controller 110; and (5) the data information DA3 for the first cache read address A3 528 is latched by the L2 controller 110.

At L2 cycle 514, the following occurs:

(1) the second cache read address B1 530 is incremented, hereinafter referred to as B2 530;

(2) the tag information TB 551 for the cache read address B0 530 is latched by the L2 controller 110; and (3) the data information DB0 for the cache read address B0 530 is latched by the L2 controller.

At L2 cycle 516, the following occurs:

(1) an address Z 534 for a fourth snoop operation is placed on the L2 address bus 204;

(2) the second cache read address B2 530 is incremented, hereinafter referred to as B3 530;

(3) the tag information Ty 552 for the third snoop address Y 532 is latched by the L2 controller 110; and (4) the data information DB1 554 for the second cache read address B1 530 is latched by the L2 controller 110.

At L2 cycle 518, the data information DB2 for the second cache read address B2 530 is latched by the L2 controller 110 and the increment address connection 228 is returned to an inactive high state. At L2 cycle 520, the following occurs:

(1) the tag information Tz 558 for the fourth snoop address Z 534 is latched by the L2 controller 110; and (2) the data information DB3 560 for the second cache read address B3 530 is latched by the L2 controller 110.

The above enumeration illustrates a two times improvement in data band width and critical word latency using the improved interface 106 of FIG. 4. It should clearly be understood that the above enumerated discussion for a L2 cache line 104 read operation is equally applicable to a L2 cache 104 line write operation as well.

It is thus believed that the operation and construction of the present invention will be apparent from the foregoing description. While the method and system shown and described has been characterized as being preferred, it will be readily apparent that various changes and/or modifications could be made therein without departing from the spirit and scope of the present invention as defined in the following claims. For example, although the present invention has been described in connection with a multi-processor system, it should clearly be understood that the present invention is equally applicable to a uni-processor system as well.

What is claimed is:

1. An apparatus for processing multiple cache operations in a cache having a tag array and a data array, the tag and data arrays sharing a common address bus for both snoop and data operations, the address bus having a capacity smaller than that of a cache line in the cache, and the cache being associated with at least one processor, the apparatus comprising:

means for receiving a request, from the at least one processor, for data residing in the cache;

means for snooping a request, from another processor, for data residing in the cache, and simultaneous means for simultaneously processing the received request and the snooped request via the tag and data arrays, the simultaneous means including:

single address means for requiring only a single address on the shared address bus in order to provide all of the data for the received request data for the received request being provided after only receiving a single address on the shared address bus;

wherein the single address means includes means for receiving in the data array a load address signal from a source external to the data array for informing the data array to latch the single address of the received request and means for receiving in the data array an increment address signal from the source external to the data array for incrementing the latched address.

2. The apparatus of claim 1 wherein the means for snooping includes:

means for snooping a request on a system bus, from another processor, for data residing in the cache.

3. The apparatus of claim 2 wherein the single address means includes:

means for transmitting the location of the data for the received request to the data array;

means for transmitting the location of the data for the snooped request to the tag array; and means for simultaneously transmitting both the located data in the tag array, and the located data in the data array.

4. A method of processing multiple cache operations in a cache having a tag array and a data array, the tag and data arrays sharing a common address bus for both snoop and data operations, the address bus having a capacity smaller than that of a cache line in the cache, and the cache being associated with at least one processor, the method comprising the steps of:

receiving a request, from the at least one processor, for data residing in the cache;

snooping a request, from another processor, for data residing in the cache, and simultaneously processing the received request and the snooped request via the tag and data arrays, all of the data for the received request being provided after only receiving a single address on the shared address bus;

wherein the step of simultaneously processing includes receiving in the data array a load address signal from a source external to the data array for informing the data array to latch the single address of the received request and receiving in the data array an increment address signal from the source external to the data array for incrementing the latched address.

5. The method of claim 4 wherein the step of snooping includes the step of:

snooping a request on a system bus, from another processor, for data residing in the cache.

6. The method of claim 5 wherein the step of simultaneously processing includes the steps of:

transmitting the location of the data for the received request to the data array;

transmitting the location of the data for the snooped request to the tag array; and simultaneously transmitting both the located data in the tag array, and the located data in the data array.

7. A data processing system comprising:

main memory for storing data;

communication means, coupled to the main memory, for communication of the main memory data;

a cache for storing a subset of the main memory data, the cache including:

a data array for storing a subset of the main memory; and a tag array for storing a location where each one of the members of the subset resides in main memory, the tag array being shared for both data and snoop type operations;

a processor, coupled to the communication means, for controlling access to said stored subset and said stored locations, and for snooping said communication means for a request for data residing in said subset, the processor including an integrated controller; and interface means, coupled between the processor and the cache, for allowing simultaneous processing by the processor of an operation for data residing in the subset, and retrieval of the stored location for the requested data, the interface means including;

a shared common address bus, coupled to the integrated controller, the tag array, and the data array, for determining whether data resides in the data array, and for retrieving data from the data array simultaneously, and single address means for requiring only a single address, on the shared address bus, in order to provide all of the data for the operation, where the single address means includes a load address connection, coupled between said data array and said integrated controller, for informing said data array when to latch a location on said address bus and an increment address connection, coupled between said data array and said integrated controller, for informing said data array when to increment said latched location.

8. The data processing system of claim 7 wherein said processor includes:

an integrated controller for controlling the retrieval of said stored subset and said stored locations, and for snooping said communication means for a request for data residing in said subset.

9. The data processing system of claim 8, wherein said operation is a request by said processor for retrieval of data from said subset.

10. The data processing system of claim 8, wherein said operation is a request by said processor for storage of data in said subset.

11. The data processing system of claim 8, wherein said cache is external to said processor.

12. The data processing system of claim 11 wherein said interface means further includes:
   a tag data bus, coupled between said integrated controller and said tag array, for retrieving said stored locations from said tag array; and
   a data array bus, coupled between said integrated controller and said data array, for retrieving the members of said subset from said data array.

* * * * *